United States Patent
Kitagawa et al.

(10) Patent No.: US 10,555,353 B2
(45) Date of Patent: Feb. 4, 2020

(54) RADIO CONTROL DEVICE, TERMINAL DEVICE, AND COMMUNICATION METHOD

(71) Applicant: KDDI CORPORATION, Tokyo (JP)

(72) Inventors: Kouichiro Kitagawa, Fujimino (JP); Xiaoqiu Wang, Fujimino (JP); Fumio Watanabe, Fujimino (JP); Yasuhiro Suegara, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 1 day.

(21) Appl. No.: 15/593,074

(22) Filed: May 11, 2017

(65) Prior Publication Data

US 2017/0251510 A1     Aug. 31, 2017

Related U.S. Application Data

(63) Continuation of application No. PCT/JP2015/081804, filed on Nov. 12, 2015.

(30) Foreign Application Priority Data

Nov. 14, 2014 (JP) ................................. 2014-232085

(51) Int. Cl.
*H04W 76/14* (2018.01)
*H04W 16/14* (2009.01)
(Continued)

(52) U.S. Cl.
CPC ........... *H04W 76/14* (2018.02); *H04W 16/14* (2013.01); *H04W 24/10* (2013.01);
(Continued)

(58) Field of Classification Search
CPC ..... H04W 16/14; H04W 24/10; H04W 72/04; H04W 92/18; H04W 76/14; H04W 72/042; H04W 72/0446; H04W 72/0453; H04W 76/02
See application file for complete search history.

(56) References Cited

U.S. PATENT DOCUMENTS

| | | | |
|---|---|---|---|
| 2013/0223398 A1* | 8/2013 | Li | H04W 72/085 370/329 |
| 2014/0204847 A1* | 7/2014 | Belleschi | H04W 76/14 370/329 |

(Continued)

FOREIGN PATENT DOCUMENTS

| | | |
|---|---|---|
| JP | 2014-195249 A | 10/2014 |
| JP | 2015-126393 A | 7/2015 |

(Continued)

OTHER PUBLICATIONS

Extended European Search Report dated Oct. 23, 2017, issued in corresponding European Patent Application No. 15858596.8. (12 pages).

(Continued)

*Primary Examiner* — Kyaw Z Soe
(74) *Attorney, Agent, or Firm* — Fitch, Even, Tabin & Flannery LLP

(57) ABSTRACT

A base station device (E-UTRAN) assigns a frequency band unsupported by the base station device as a radio resource usable for terminal-to-terminal communication, and transmits resource information for designating the assigned radio resource to a first terminal device and a second terminal device.

2 Claims, 14 Drawing Sheets

(51) Int. Cl.
*H04W 24/10* (2009.01)
*H04W 72/04* (2009.01)

(52) U.S. Cl.
CPC ..... *H04W 72/042* (2013.01); *H04W 72/0446* (2013.01); *H04W 72/0453* (2013.01)

(56) References Cited

U.S. PATENT DOCUMENTS

| | | | |
|---|---|---|---|
| 2014/0206322 A1* | 7/2014 | Dimou | H04W 76/14 455/414.1 |
| 2014/0219261 A1* | 8/2014 | Johnsson | H04W 8/005 370/338 |
| 2015/0103789 A1* | 4/2015 | Tanaka | H04W 72/0426 370/329 |

FOREIGN PATENT DOCUMENTS

| | | |
|---|---|---|
| WO | 2012/068731 A1 | 5/2012 |
| WO | 2014/111868 A2 | 7/2014 |
| WO | 2014/111896 A2 | 7/2014 |
| WO | 2015/053382 A1 | 4/2015 |

OTHER PUBLICATIONS

International Search Report dated Jan. 26, 2016 for PCT/JP2015/081804 and English translation of the same (2 pages).
3GPP TR23.703 Ver.0.4.1 "Study on architecture enhancements to support proximity services (ProSe)" Jun. 2013 (85 pages).
3GPP TR36.843 Ver.12.0.1 "Study on LTE Device to Device Proximity Services" Mar. 2014 (50 pages).
TS36.101 Ver.12.0.0, "Evolved Universal Terrestrial Radio Access (E-UTRA); User Equipment (UE) radio transmission and reception" Jul. 2013 (450 pages).
TS36.104 Ver.12.0.0, "Evolved Universal Terrestrial Radio Access (E-UTRA); Base Station (BS) radio transmission and reception" Jul. 2013 (139 pages).
TS23.203 Ver.13.0.1, Technical Specification Group Services and System Aspects; Policy and charging control architecture Jun. 2014 (220 pages).

\* cited by examiner

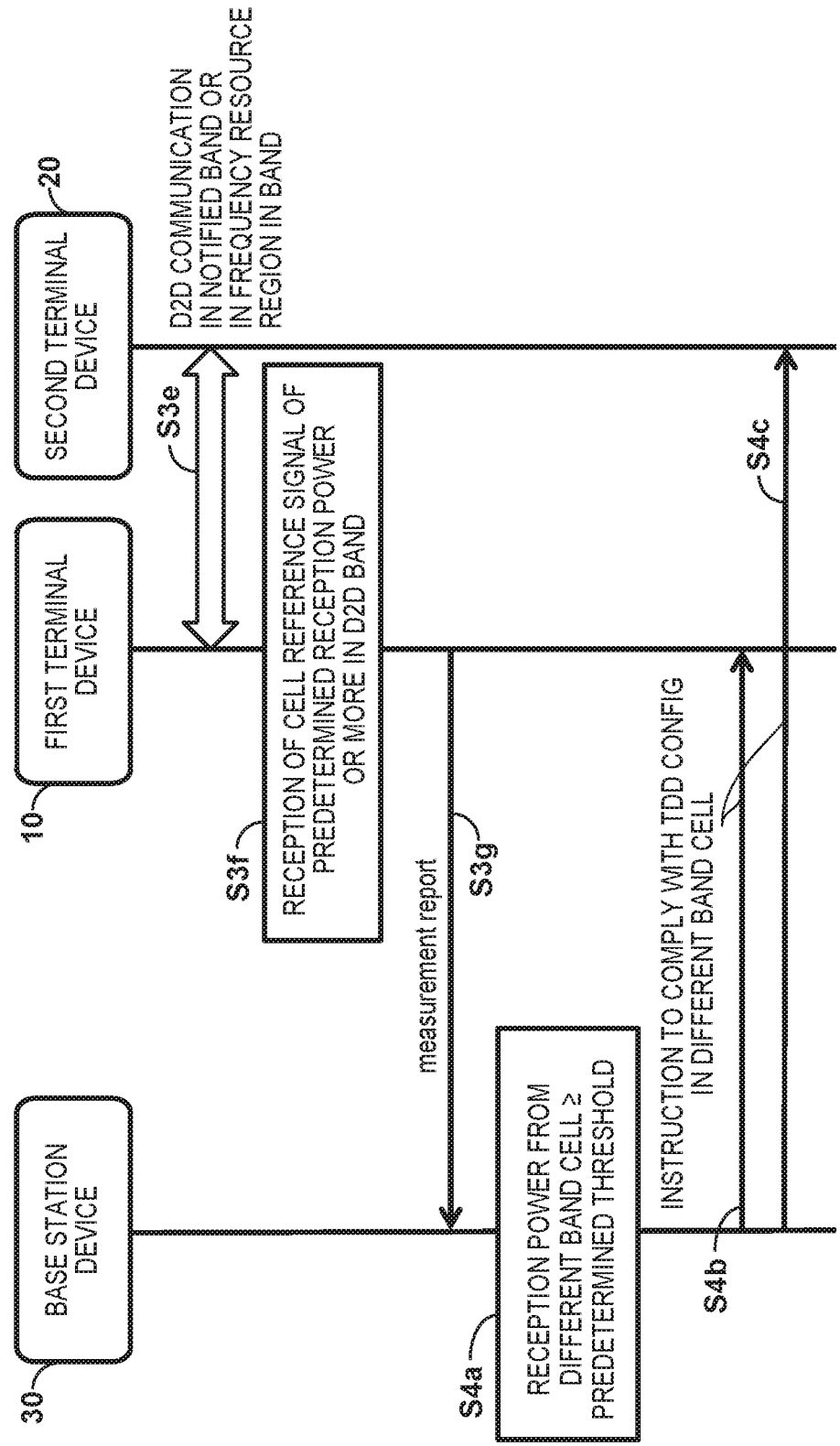

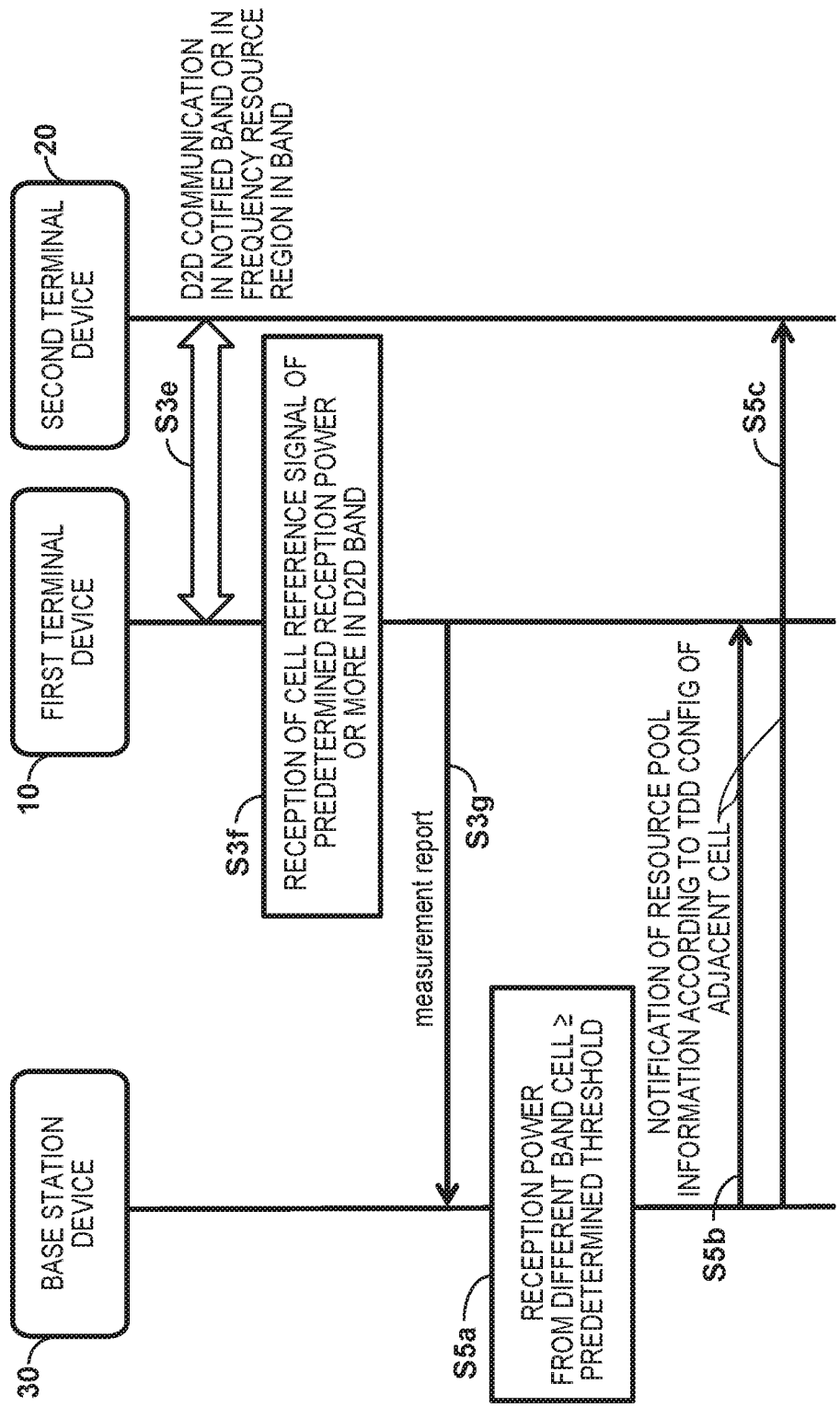

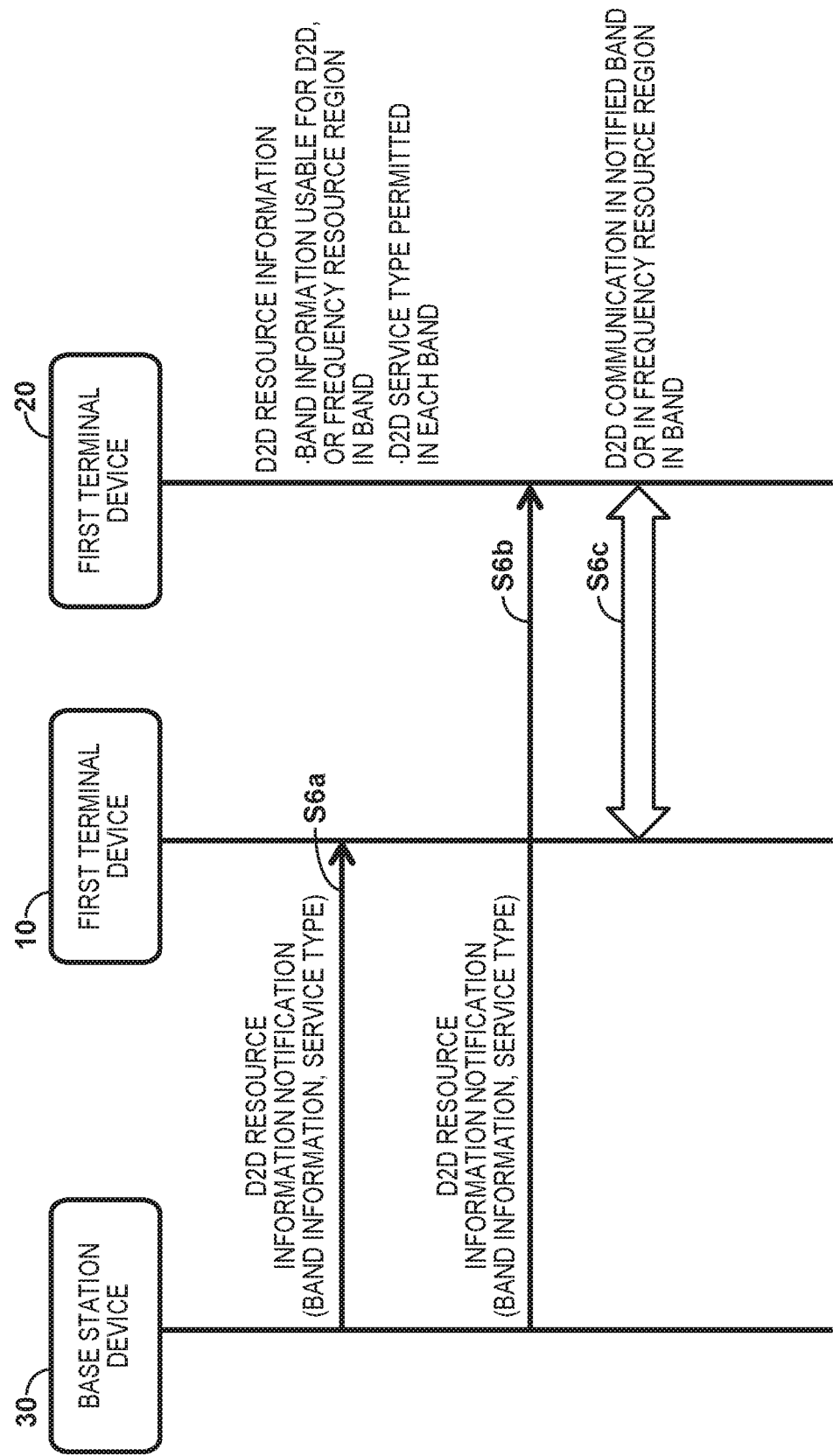

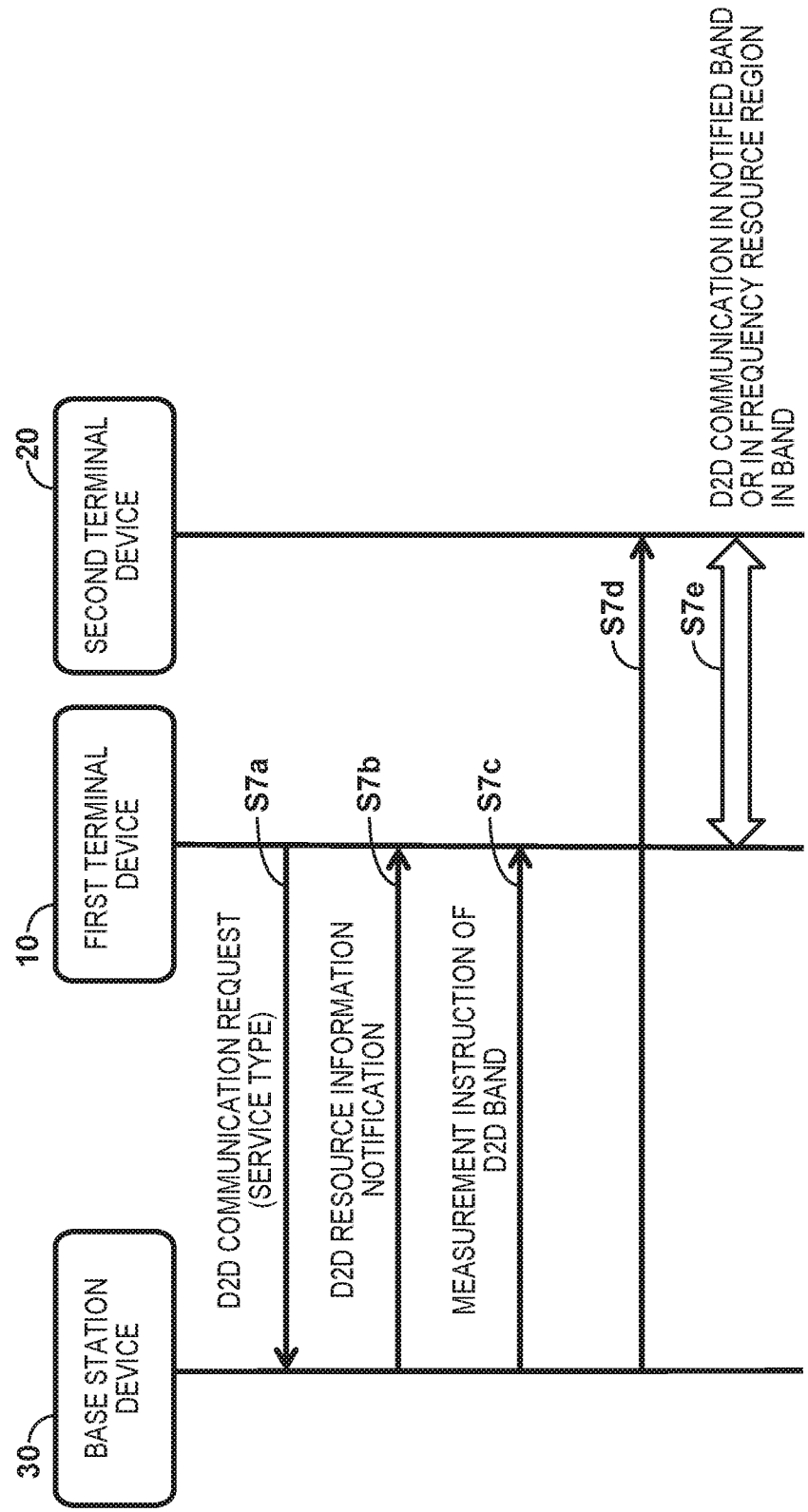

RADIO CONTROL DEVICE, TERMINAL DEVICE, AND COMMUNICATION METHOD

CROSS-REFERENCE TO RELATED APPLICATIONS

This application is a continuation of International Patent Application No. PCT/JP2015/081804 filed on Nov. 12, 2015, and claims priority to Japanese Patent Application No. 2014-232085 filed on Nov. 14, 2014, the entire content of both of which is incorporated herein by reference.

TECHNICAL FIELD

The present invention relates to a radio control device, a terminal device, and a communication method and, more particularly, to a radio control device, a terminal device, and a communication method for performing direct communication between terminal devices in a wireless communication system.

BACKGROUND ART

In E-UTRAN (Evolved Universal Terrestrial Radio Access Network), discussions have recently taken place concerning device-to-device communication (to be referred to as D2D communication hereinafter) that is a technique of allowing a plurality of terminal devices (User Equipment: to be referred to as UE hereinafter) to do direct communication without an intervention of a base station.

D2D communication is executed using, for example, some of radio resources used in uplink of cellular communication such as LTE. The distance between terminal devices to which the D2D communication can be applied is said to be several hundred m. In 3GPP (3rd Generation Partnership Project) Release 12, a method of causing a terminal device to detect a terminal located in the vicinity and a method of broadcasting data to unspecified terminal devices have been proposed (for example, see NPL 1 or 2).

CITATION LIST

Non-patent Literature

NPL 1: 3GPP TR23.703 Ver.0.4.1, "study on architecture enhancements to support proximity services (ProSe)", June 2013

NPL 2: 3GPP TR36.843 Ver.12.0.1 "Study on LTE Device to Device Proximity Services", March, 2014

SUMMARY OF INVENTION

Technical Problem

However, if a frequency band used in device-to-device communication becomes unusable or inappropriate for use, the device-to-device communication cannot be continued.

The present invention has been made in consideration of the above-described problem, and has as its object to provide a radio control device, a terminal device, and a communication method for implementing high continuity of terminal device-to-terminal device communication.

Solution to Problem

According to an aspect of the present invention, there is provided a radio control device for controlling terminal-to-terminal communication in which a plurality of terminal devices perform direct wireless communication without an intervention of a base station device, comprising a control unit configured to assign a frequency band unsupported by the base station device as a radio resource usable for the terminal-to-terminal communication, and a wireless communication unit configured to transmit resource information about the radio resource assigned by the control unit to the terminal devices. The wireless communication unit may transmit the resource information by a broadcast channel. The wireless communication unit may transmit, as the resource information, information about a frequency resource and/or information about a time resource. The wireless communication unit may further transmit information about at least one service type permitted in the terminal-to-terminal communication using the radio resource assigned by the control unit.

According to this aspect, it is possible to dynamically change the radio resource from the wireless network side and appropriately manage the band used to execute terminal-to-terminal communication. It is therefore possible to provide terminal-to-terminal communication holding high communication continuity and also effectively use the radio resource. Note that the radio control device includes, for example, E-UTRAN, and means a concept including a base station device or a host apparatus thereof.

The control unit may assign the radio resource to each terminal device, and the wireless communication unit may transmit, by a dedicated channel, the resource information for designating the radio resource assigned to each terminal device. After the control unit assigns the radio resource to the terminal device, the wireless communication unit may receive measurement information about radio quality reported by the terminal device, the control unit may determine, based on the measurement information from the terminal device, whether to switch the assigned radio resource, and upon determining to switch the radio resource, generate switching information about switching, and the wireless communication unit may transmit the switching information generated by the control unit to the terminal device. After the control unit assigns the radio resource to the terminal device, the wireless communication unit may receive measurement information about radio quality reported by the terminal device, and the control unit may determine, based on the measurement information from the terminal device, whether to switch the assigned radio resource, and upon determining not to switch the radio resource, inhibit transmission of switching information about switching to the terminal device. Based on a service type, which is to be performed in the terminal-to-terminal communication and is requested by the terminal device, the control unit may assign a radio resource to be used for the service type.

According to this aspect, it is possible to change the radio resource to a more appropriate one from the wireless network side and appropriately manage the band used to execute terminal-to-terminal communication. It is therefore possible to provide terminal-to-terminal communication holding high communication continuity and also effectively use the radio resource.

According to another aspect of the present invention, there is provided a terminal device for performing terminal-to-terminal communication in which a plurality of terminal devices directly perform wireless communication without an intervention of a base station device, comprising a communication unit configured to receive resource information for designating a frequency band unsupported by the base station device as a radio resource usable for the terminal-to-terminal communication, and a control unit configured to determine whether the terminal device can handle the radio resource designated by the resource information, if the terminal device can handle the radio resource, execute the terminal-to-terminal communication using the radio resource, and if the terminal device cannot handle the radio resource, execute the terminal-to-terminal communication using a usable radio resource supported by the base station device and permitted to be used for the terminal-to-terminal communication.

According to this aspect, if the terminal device can handle the radio resource designated by the resource information, it can continuously execute terminal-to-terminal communication using the radio resource. It is also possible to effectively use an unused band and save use of a radio resource of cellular communication.

According to still another aspect of the present invention, there is provided a communication method in a communication system including a plurality of terminal devices and a radio control device for controlling terminal-to-terminal communication in which the plurality of terminal devices directly perform wireless communication without an intervention of a base station device, comprising, in the radio control device, assigning a frequency band unsupported by the base station device as a radio resource usable for the terminal-to-terminal communication, and transmitting resource information for designating the assigned radio resource to the terminal devices, and in the terminal device, receiving the resource information, and determining whether the terminal device can handle the radio resource designated by the resource information, if the terminal device can handle the radio resource, executing the terminal-to-terminal communication using the radio resource, and if the terminal device cannot handle the radio resource, executing the terminal-to-terminal communication using a radio resource usable for the terminal-to-terminal communication in a frequency band supported by the base station device.

Note that an arbitrary combination of the above-described constituent elements or the expression of the present invention, which is converted between an apparatus, a system, a computer program, and the like, is also effective as an aspect of the present invention.

Advantageous Effects of Invention

According to the present invention, it is possible to provide a radio control device, a terminal device, and a communication method for implementing high continuity of terminal-to-terminal communication and enabling effective use of radio resources.

Other features and advantages of the present invention will be apparent from the following descriptions taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 10A is a sequence chart showing an example of a band transition processing according to Example 2;

FIG. 10B is a sequence chart showing an example of a band transition processing according to Example 2;

FIG. 12 is a sequence chart showing an example of the operation of a wireless communication system according to Example 3; and FIG. 13 is a sequence chart showing an example of the operation of the wireless communication system according to Example 3.

DESCRIPTION OF EMBODIMENTS (Outline of Present Invention)

The outline of the present invention will be described first before an explanation of the examples of the present invention. The present invention is directed to a D2D communication technique of causing terminal devices to directly perform wireless communication. A radio control device according to the present invention assigns a frequency band that is not supported by a base station device as a radio resource usable for D2D communication, and transmits resource information that designates the assigned radio resource to a terminal device. Upon receiving the resource information, the terminal device determines whether the terminal device can handle the radio resource designated by the resource information. If the terminal device can handle the radio resource, device-to-device communication is executed using the radio resource. If the terminal device cannot handle the radio resource, device-to-device communication is executed using a radio resource usable for device-to-device communication in a frequency band supported by the base station device.

Normally, to execute communication by a terminal device in a cellular system, a base station needs to be deployed in the area where the terminal device exists. However, installing a base station needs various procedures, and this is a very expensive work. On the other hand, for example, the above-described D2D communication technique is a technique of performing direct communication between the terminal devices without an intervention of a base station. Since a base station need not always exist to execute the D2D communication, the above-described installation of a base station can be implemented without cost.

As described above, since the cost of installation of a base station is very high, it is very difficult to deploy base stations like small cells whose coverage area per base station is small on a nationwide basis. For this reason, even if there is a dedicated band (frequency band) usable for a small cell, the band cannot be used for communication in an area where a small area is not deployed. If the above-described D2D communication technique is used, communication using the band is possible. However, a terminal device cannot know that the band is usable for D2D communication. According to a related art, the band can be used an independent ad hoc band. In this case as well, if the band becomes unusable, the communication cannot be continued.

The present invention solves the above-described problems. It is possible to dynamically change the radio resource from the wireless network side and appropriately manage the band used to execute device-to-device communication. It is therefore possible to provide device-to-device communication holding high communication continuity and also effectively use the radio resource.

(Example of Arrangement of Wireless Communication System)

Figure 1:
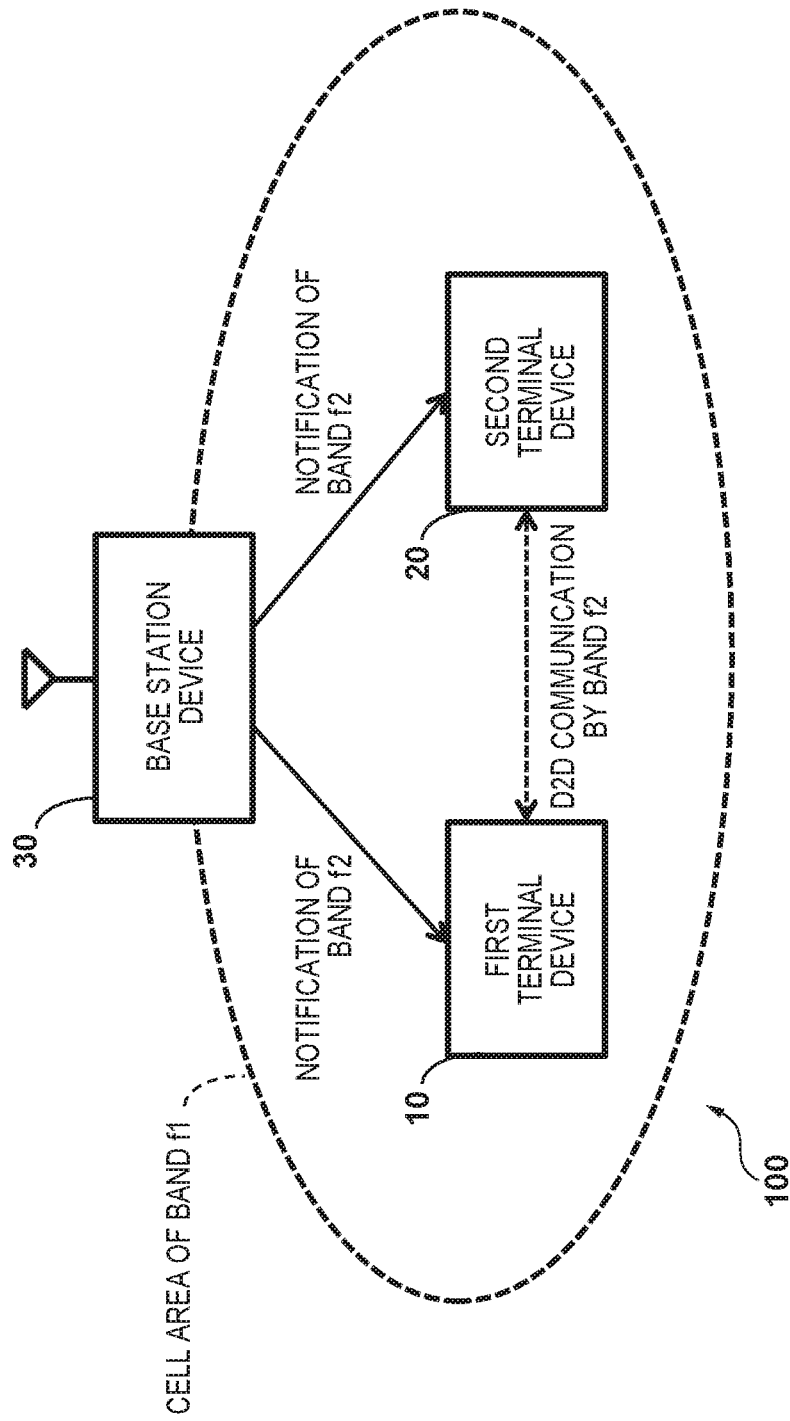
FIG. 1 is a block diagram showing an example of the arrangement of a wireless communication system according to an embodiment of the present invention.

FIG. 1 is a block diagram showing an example of the arrangement of a wireless communication system according to an embodiment of the present invention. For example, a wireless communication system 100 includes a first terminal device 10, a second terminal device 20, and a base station device (E-UTRAN) 30 that constitutes a wireless access network of an LTE system.

The base station device 30 supports a band f1 for cellular communication. The first terminal device 10 and the second terminal device 20 are located in the cell area of the band f1, and can perform cellular communication with the base station device 30 using the band f1. The first terminal device 10 and the second terminal device 20 are terminals capable of executing device-to-device communication (D2D communication) without an intervention of the base station device 30. The first terminal device 10 and the second terminal device 20 are assumed to be in an RRC_CONNECTED state to the base station device 30 here. The RRC_CONNECTED state is a state in which the base station device manages radio resources, and the terminal devices can transmit/receive data. In this state, functions such as data transmission/reception and feedback of information such as CQI (Channel Quality Indicator) to the base station device can be executed.

Additionally, in this embodiment, the base station device 30 can transmit, to the first terminal device 10 and the second terminal device 20, a notification (resource information) that allows them to use, in D2D communication, a radio resource in a band f2 unsupported by the base station. By receiving the notification, the first terminal device 10 and the second terminal device 20 can execute D2D communication with each other using the radio resource in the band f2. This makes it possible to effectively use an unused band and save use of a radio resource of cellular communication. Note that "supported/unsupported" includes that a device does not have a communication function for the band, and also includes that a device has the communication function but is not allowed to use the band. Note that the present invention is not limited to the above-described arrangement, and at least one of the first terminal device 10 and the second terminal device 20 needs to be in the RRC_CONNECTED state to the base station device 30. For example, only the first terminal device 10 may receive the notification representing the permission of use of the radio resource in the band f2 for D2D communication from the base station device 30, and not the base station device 30 but the first terminal device 10 may notify the second terminal device 20 that the band f2 is usable. This also applies to examples to be described later.

(Example of Arrangement of Terminal Device)

Figure 2:
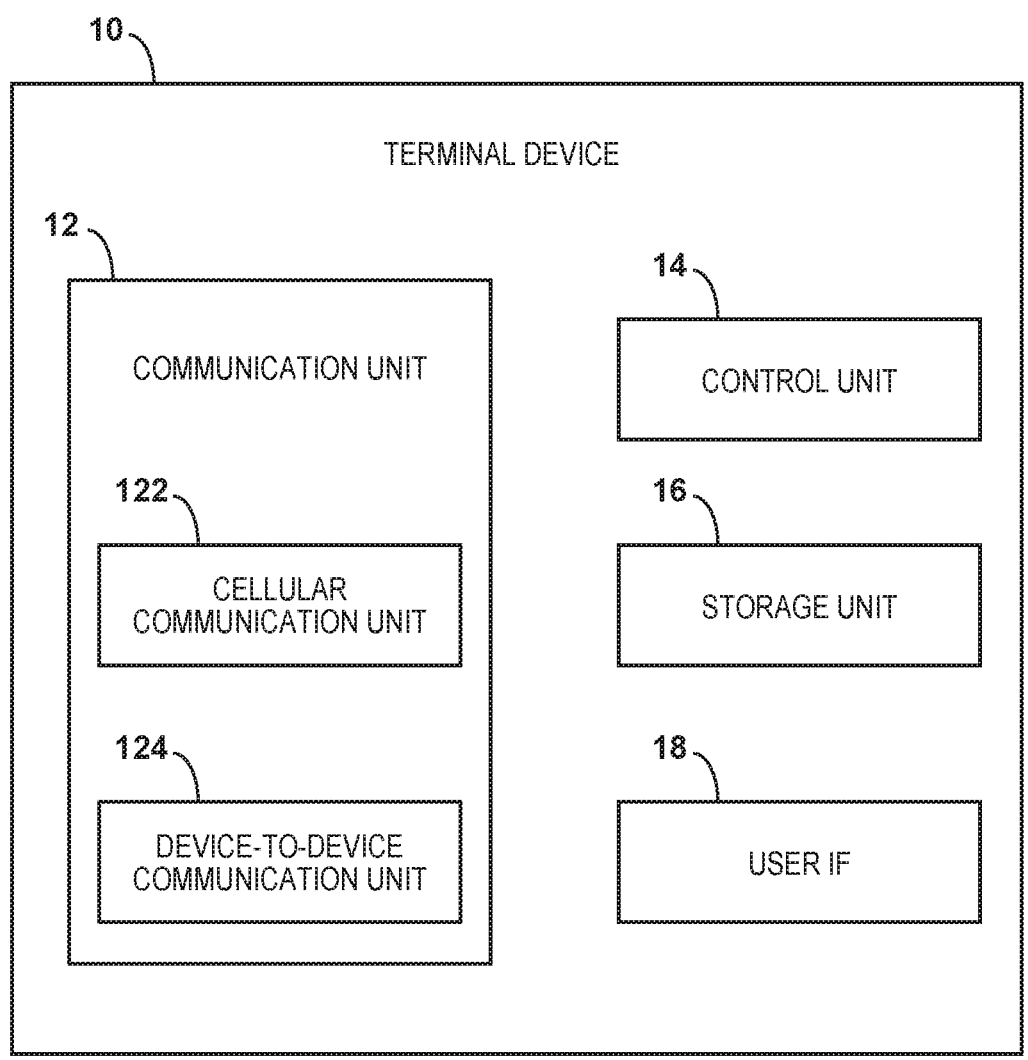
FIG. 2 is a block diagram showing an example of the arrangement of a terminal device shown in FIG. 1.

FIG. 2 is a block diagram showing an example of the arrangement of a terminal device used as the first terminal device 10 and the second terminal device 20 shown in FIG. 1. The terminal device includes a communication unit 12, a control unit 14, a storage unit 16, and a user interface (user IF) 18.

The communication unit 12 includes a cellular communication unit 122 and a device-to-device communication unit 124. The cellular communication unit 122 performs wireless communication with the base station device 30. The device-to-device communication unit 124 directly communicates with a terminal device as the partner of D2D communication without an intervention of the base station device 30 using a radio resource for D2D communication assigned by the base station device. These communication processes may be done using a known modulation/demodulation technology or antenna technology.

The storage unit 16 may store data transmitted from the base station device 30 or the terminal device as the partner of D2D communication, or may store data that is obtained via the user IF 18 and should be transmitted to the base station device 30 or the terminal device as the partner of D2D communication. The user IF 18 may include a screen interface, an input interface such as an operation button or a touch panel configured to receive an input from the user, and an image capturing means such as a camera.

The control unit 14 is formed by, for example, a CPU and generally controls the units using information received from the cellular communication unit 122 or the device-to-device communication unit 124 or information stored in the storage unit 16.

If the cellular communication unit 122 receives resource information that designates the band f2 unsupported by the base station device 30 as a radio resource usable for device-to-device communication, the control unit 14 determines whether the terminal device can handle the radio resource of the band f2 designated by the resource information. If the terminal device can handle the band f2, the control unit 14 controls execution of D2D communication with the terminal device of the partner by the device-to-device communication unit 124. If the terminal device cannot handle the band f2, and a radio resource usable for D2D communication in the band f1 supported by the base station device 30 is notified in advance by a control message or the like from the base station device 30, D2D communication can be executed using the radio resource of the band f1.

In addition, the control unit 14 measures the radio quality of the downlink for each cell of the base station device 30 and base station devices on the periphery using a radio signal received by the cellular communication unit 122. Also, the control unit 14 may transmit/receive a known signal to/from the partner in device-to-device communication, thereby measuring radio quality for a radio resource used in the device-to-device communication. For example, in the LTE system, RSRP (Reference Signal Received Power) and/or RSRQ (Reference Signal Received Quality) of a reference signal is measured as radio quality. The control unit 14 reports radio quality information including a measurement target such as the identifier (ID) of each cell and measured radio quality to the base station device 30 as needed.

(Example of Arrangement of Base Station Device 30)

Figure 3:
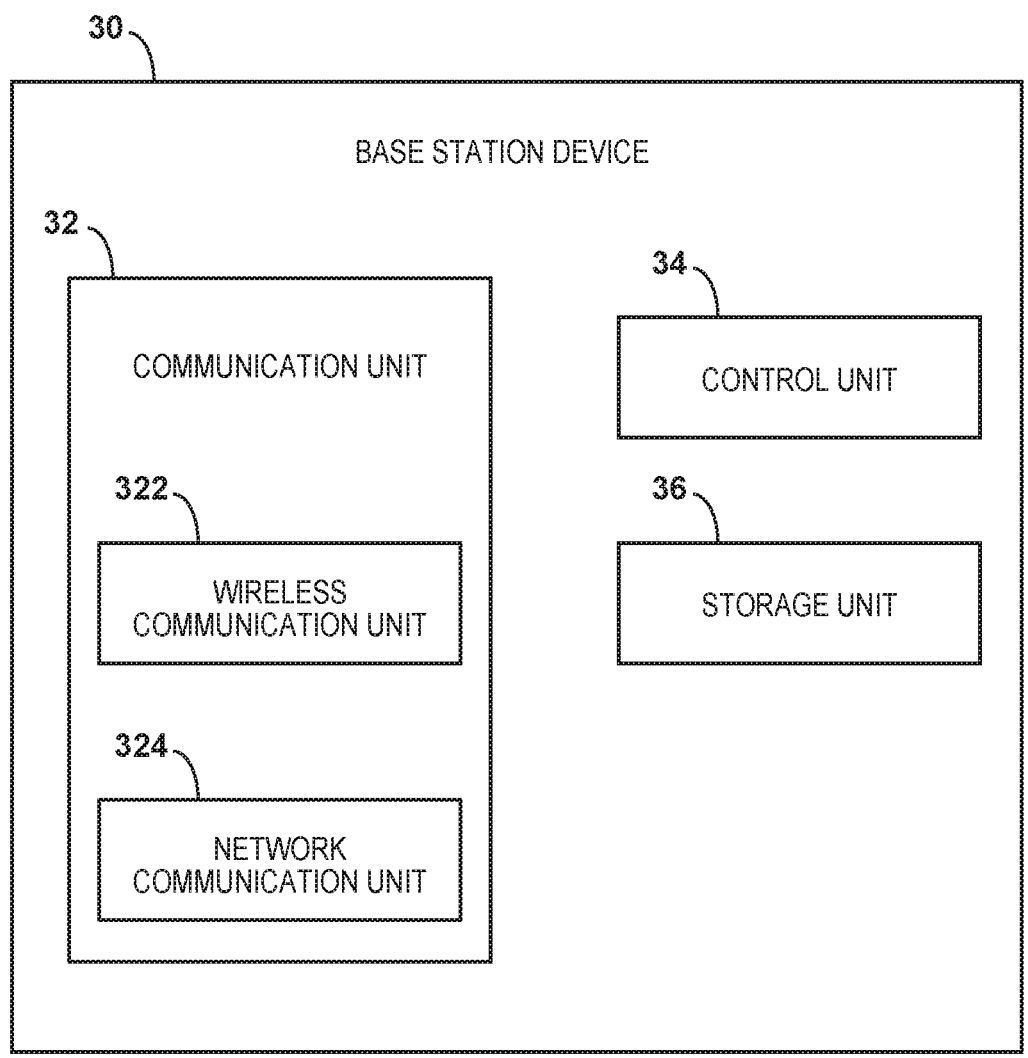
FIG. 3 is a block diagram showing an example of the arrangement of a base station device shown in FIG. 1.

FIG. 3 is a block diagram showing an example of the arrangement of the base station device 30 shown in FIG. 1.

The base station device 30 includes a communication unit 32, a control unit 34, and a storage unit 36.

The communication unit 32 includes a wireless communication unit 322 and a network communication unit 324. The wireless communication unit 322 executes wireless cellular communication using a predetermined cellular method with each of the first terminal device 10 and the second terminal device 20 both of which belong to the cell area of the local station while the control unit 34 uses information stored in the storage unit 36. The network communication unit 324 executes inter-base station communication with another adjacent base station device via an X2 interface or the like. The storage unit 36 stores TDD config information and the like acquired from another adjacent base station device via the network communication unit 324.

The wireless communication unit 322 transmits resource information about a radio resource assigned by the control unit 34 to the terminal devices. The resource information may be transmitted by broadcast using a broadcast channel or may be transmitted to a specific terminal device using a dedicated channel. The resource information may include information about a frequency resource and/or information about a time resource. After the control unit 34 assigns a radio resource for each terminal device, the wireless communication unit 322 may receive measurement information about radio quality reported from each terminal device and transmit switching information generated by the control unit 34 based on the measurement information to the terminal device. The wireless communication unit 322 may further transmit information about one or more service types permitted in device-to-device communication using the radio resource assigned by the control unit 34. Note that details of the service types will be described later.

The control unit 34 notifies a radio resource usable for D2D communication in the band f1 supported by the base station device 30 to the first terminal device 10 and the second terminal device 20 by a control message or the like. The control unit 34 can also assign the band f2 unsupported by the base station device 30 as a radio resource usable for D2D communication and transmit resource information that designates the assigned radio resource to the first terminal device 10 and the second terminal device 20. The resource information can be broadcast by a broadcast channel to terminal devices located in the cell area of the band f1. The control unit 34 may assign the radio resource of the band f2 for each terminal device and transmit resource information that designates the radio resource assigned for each terminal device by a dedicated channel.

The control unit 34 may determine based on measurement information reported from each terminal device whether to switch the assigned radio resource. Upon determining to switch the radio resource, the control unit 34 may generate switching information concerning switching. The switching information may include information about the radio resource of the switching destination. Additionally, based on a service type of device-to-device communication, which is requested by a terminal device, the control unit 34 may assign a radio resource to be used for the service type. Note that the term "switch" may be replaced with a term such as "change", "correct", "transit", "shift", "exchange", "substitute", "set", or "reconfigure".

In LTE, a QCI (QoS Class Identifier) that determines a class in QoS (Quality of Service) control is defined. The base station device 30 stores information (QCI table) about the QCI in the storage unit 36 in advance. The control unit 34 can assign the radio resource of the band f2 or band f1 based on the class (QCI) of service quality (QoS) requested in D2D communication.

The resource information can include, for example, band information usable for D2D communication, a frequency resource region in the band, EARFCN (E-UTRAN absolute radio frequency channel number), the bandwidth of a radio resource for D2D, a system frame number, setting information of a retransmission control format designation channel (PHICH), or a downlink bandwidth, or an arbitrary combination of the above-described pieces of information.

The operation of the wireless communication system having the above-described arrangement will be described next in accordance with each example. Note that in each example, the same reference numerals are used for already described components and operations, thereby simplifying the explanation. This applies throughout the specification.

EXAMPLE 1

Example 1 of the present invention will be described with reference to FIGS. 4 to 7. In Example 1, as shown in FIG. 1, a first terminal device 10 and a second terminal device 20 exist in the cell area of a band f1 supported by a base station device 30. In Example 1, in the cell area of the band f1, resource information including one or both of band information of a band f2 unsupported by the base station and a frequency resource region in the band f2 is included in a broadcast channel from the base station device 30 of the cell and notified to the first terminal device 10 and the second terminal device 20 as a radio resource usable for D2D communication.

Figure 4:
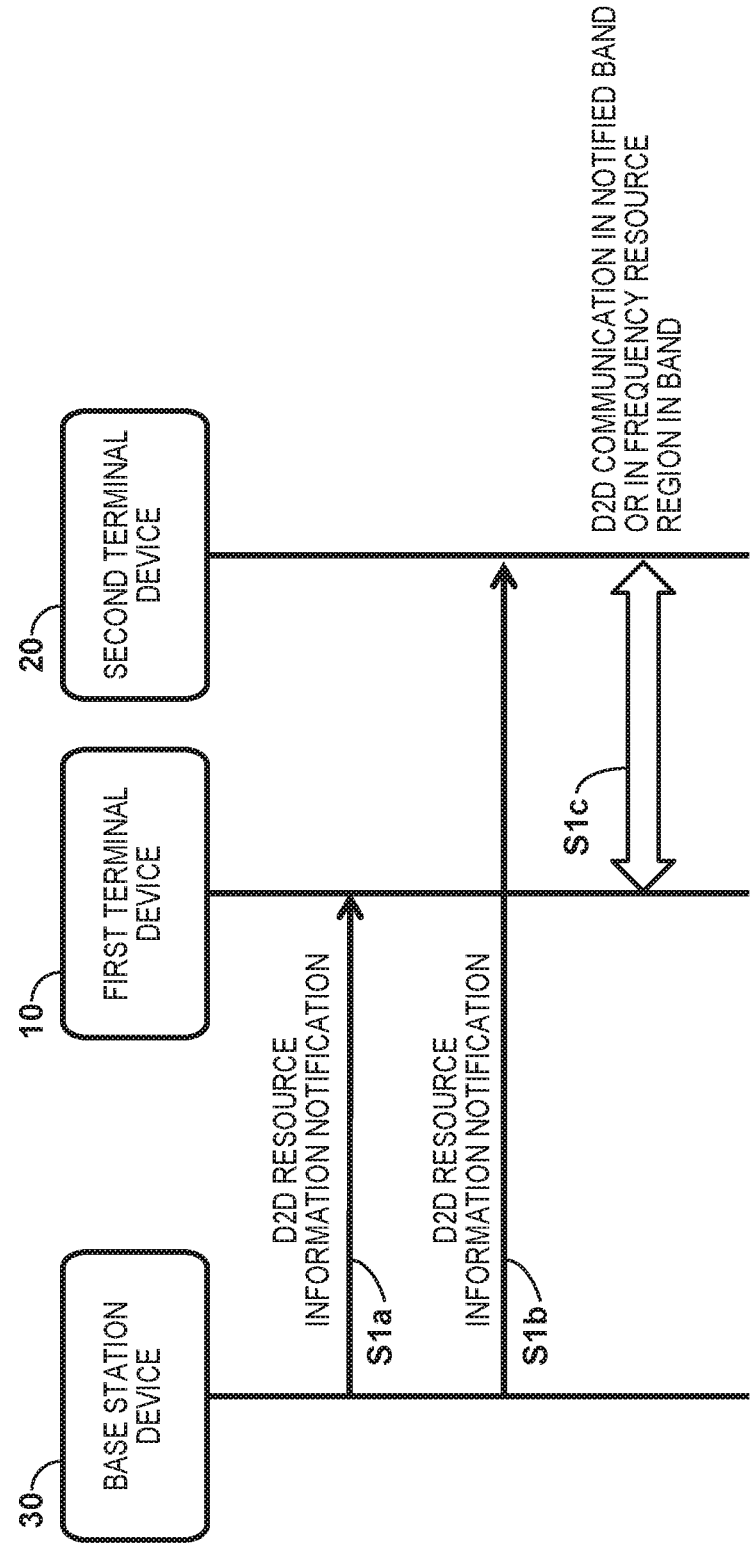
FIG. 4 is a sequence chart showing an example of the operation of a wireless communication system according to Example 1.

FIG. 4 is a sequence chart showing an example of the operation of a wireless communication system according to Example 1. Referring to FIG. 4, the base station device 30 notifies the first terminal device 10 and the second terminal device 20, by broadcast, of resource information (D2D resource information) which designates the band f2 unsupported by the base station as a radio resource usable for D2D communication and is included in an SIB (System Information Block) (steps S1a and S1b).

D2D resource information is band information usable for D2D communication, a frequency resource region in the band, the bandwidth of a radio resource for D2D, a system frame number, setting information of a retransmission control format designation channel (PHICH), or a downlink bandwidth, or an arbitrary combination of the above-described pieces of information.

The band information can be notified by, for example, a band specifier. The band specifier indicates specifiers f1, f2, f3, . . . , corresponding to different frequency bands in advance. As such a specifier, for example, a band indicator described in reference 1 (TS36.101 Ver.12.0.0, July 2013) or a carrier frequency number designated by EARFCN (E-UTRAN absolute radio frequency channel number) described in reference 2 (TS36.104) is usable.

As for the frequency resource region in the band, for example, a D2D frequency band specifier in the frequency direction and a resource assignment specifier in the time direction can be designated and thus notified. Alternatively, only the D2D frequency band specifier in the frequency direction or only the resource assignment specifier in the time direction can be notified.

Figure 5:
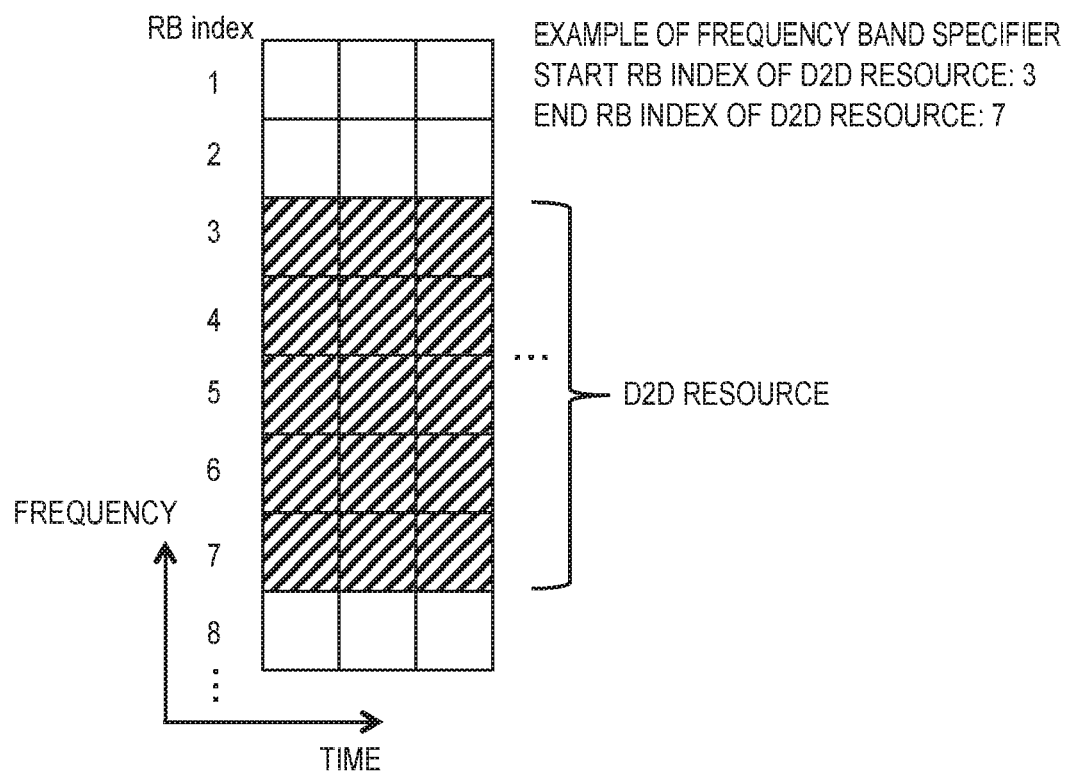
FIG. 5 is a view showing an example of a D2D communication frequency band specifier.

The D2D frequency band specifier is a specifier that adds an index (RB index) to each resource block (RB) in the band in the frequency direction and notifies an index range (a start RB index and an end RB index) representing resource blocks intended to be assigned for D2D, as shown in FIG. 5. FIG. 5 shows an example in which if the frequency band specifier includes a start RB index "3" and an end RB index "7", a frequency resource region represented by a hatched pattern is designated as a resource for D2D.

Figure 6:
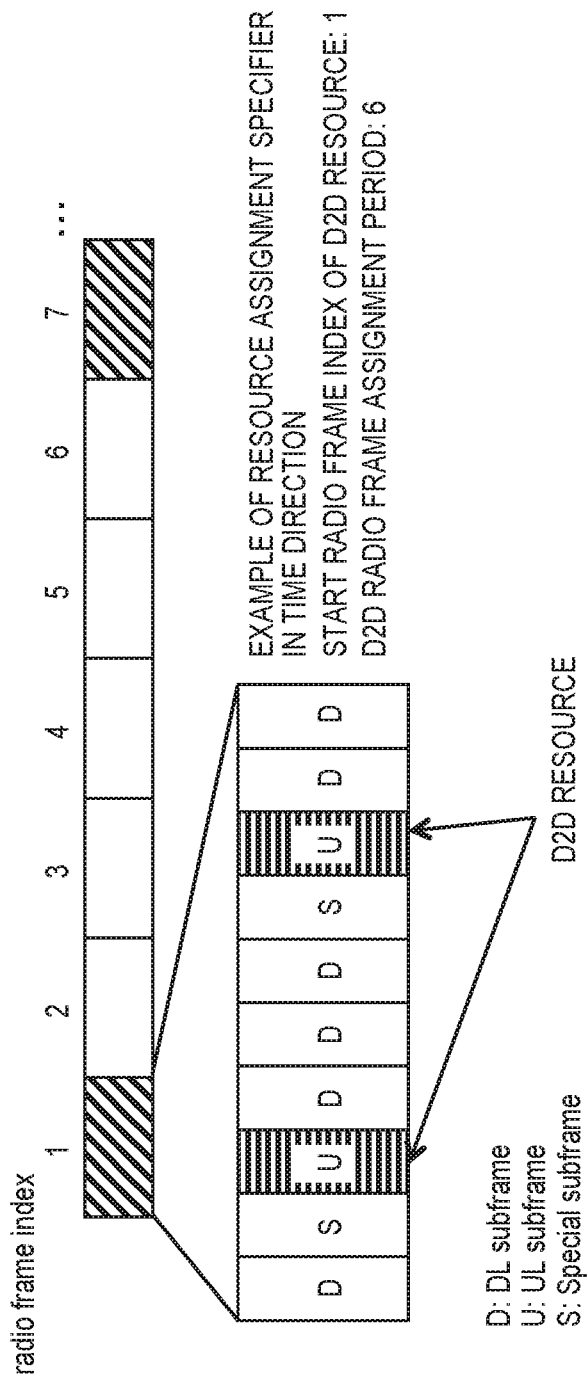
FIG. 6 is a view showing an example of a time-direction resource assignment specifier.

In the TDD system, the resource assignment specifier in the time direction is a specifier representing the start offset (start radio frame index) of a radio frame capable of using a UL subframe in the radio frame for D2D and a D2D radio frame assignment period, as shown in FIG. 6. FIG. 6 shows an example in which if the resource assignment specifier in the time direction includes a start radio frame index "1" and a D2D radio frame assignment period "6", a UL subframe represented by a horizontal line pattern of a radio frame represented by a hatched pattern is designated as a resource for D2D. In an FDD system, the resource assignment specifier in the time direction is a specifier representing a subframe number usable for D2D, the start offset of a radio frame, and a D2D radio frame assignment period.

Figure 7:
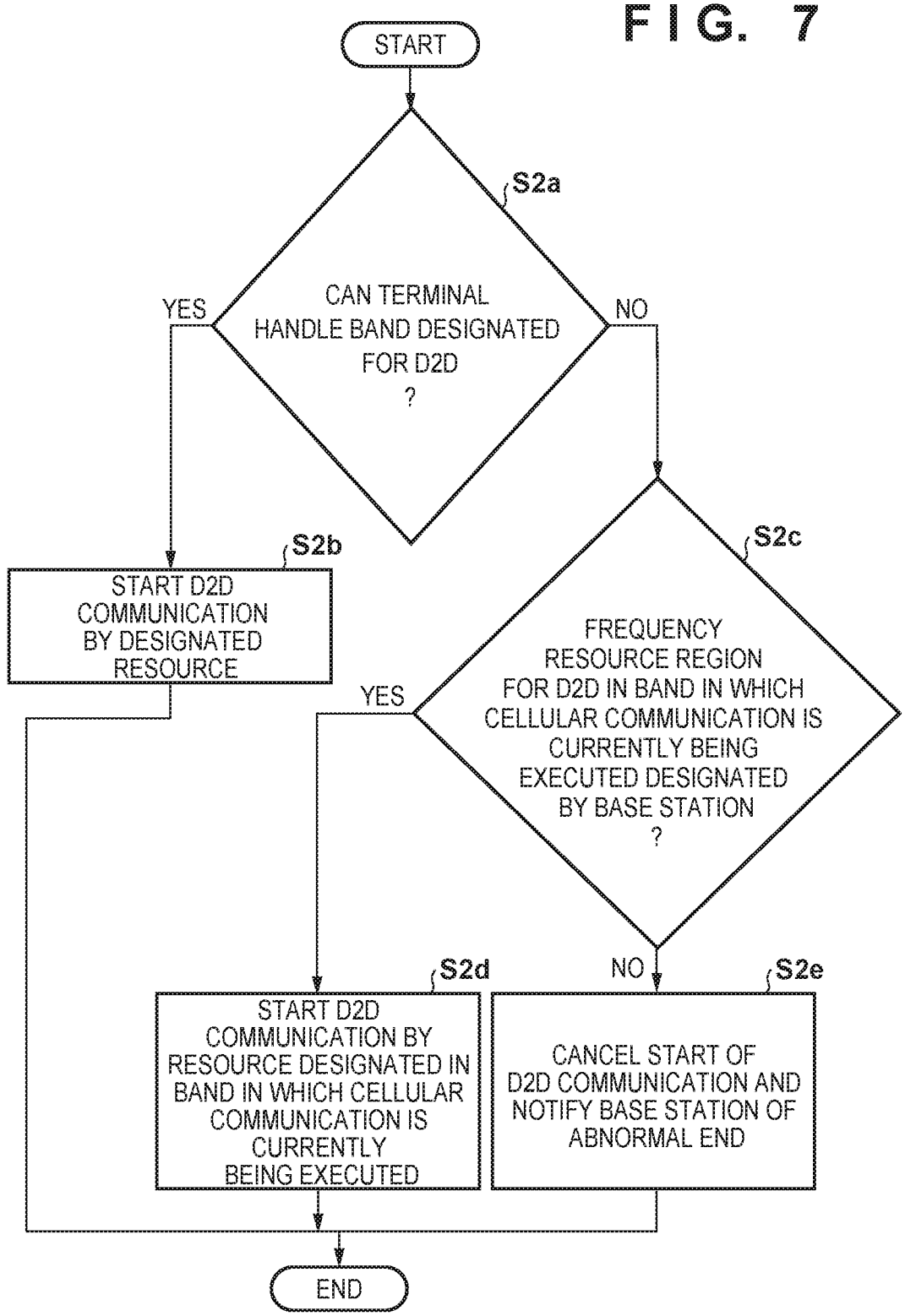
FIG. 7 is a flowchart showing an example of the operation of a terminal device according to Example 1.

Referring back to FIG. 4, each of the first terminal device 10 and the second terminal device 20 performs processing shown in the flowchart of FIG. 7, thereby executing D2D communication in the band f2 notified in steps S1a and S1b or in the frequency resource region in the band f2 (step S1c).

Referring to FIG. 7, each of the first terminal device 10 and the second terminal device 20 first determines whether the terminal can handle the band f2 designated by the D2D resource information (step S2a). If the terminal can handle the band f2, D2D communication is started using the designated resource based on the D2D resource information (step S2b). On the other hand, if the terminal cannot handle the band f2, the terminal device determines whether a frequency resource region for D2D in the band f1 supported by the base station device 30 that is currently executing cellular communication is designated by the base station device 30 (step S2c). If a frequency resource region is designated, D2D communication is started using the designated resource in the band f1 currently under the cellular communication (step S2d). If a frequency resource region for D2D in the band f1 is not designated by the base station device 30, the terminal device cancels the start of D2D communication and notifies the base station device 30 of the abnormal end (step S2e). The notification of the abnormal end in step S2e may be omitted.

As described above, according to Example 1, the base station device notifies broadcast information including a D2D resource information in the band unsupported by the base station. The terminal device executes device-to-device communication using the radio resource if it can handle the band designated by the resource information. This makes it possible to, for example, effectively use an unused band in the cell and save the use of a radio resource in cellular communication.

EXAMPLE 2

Example 2 of the present invention will be described with reference to FIGS. 8, 9, 10A, and 10B. Example 2 is a modification of Example 1, and is different from Example 1 in that D2D resource information notified by broadcast using an SIB or the like is notified by a dedicated channel such as RRC signaling.

Figure 8:
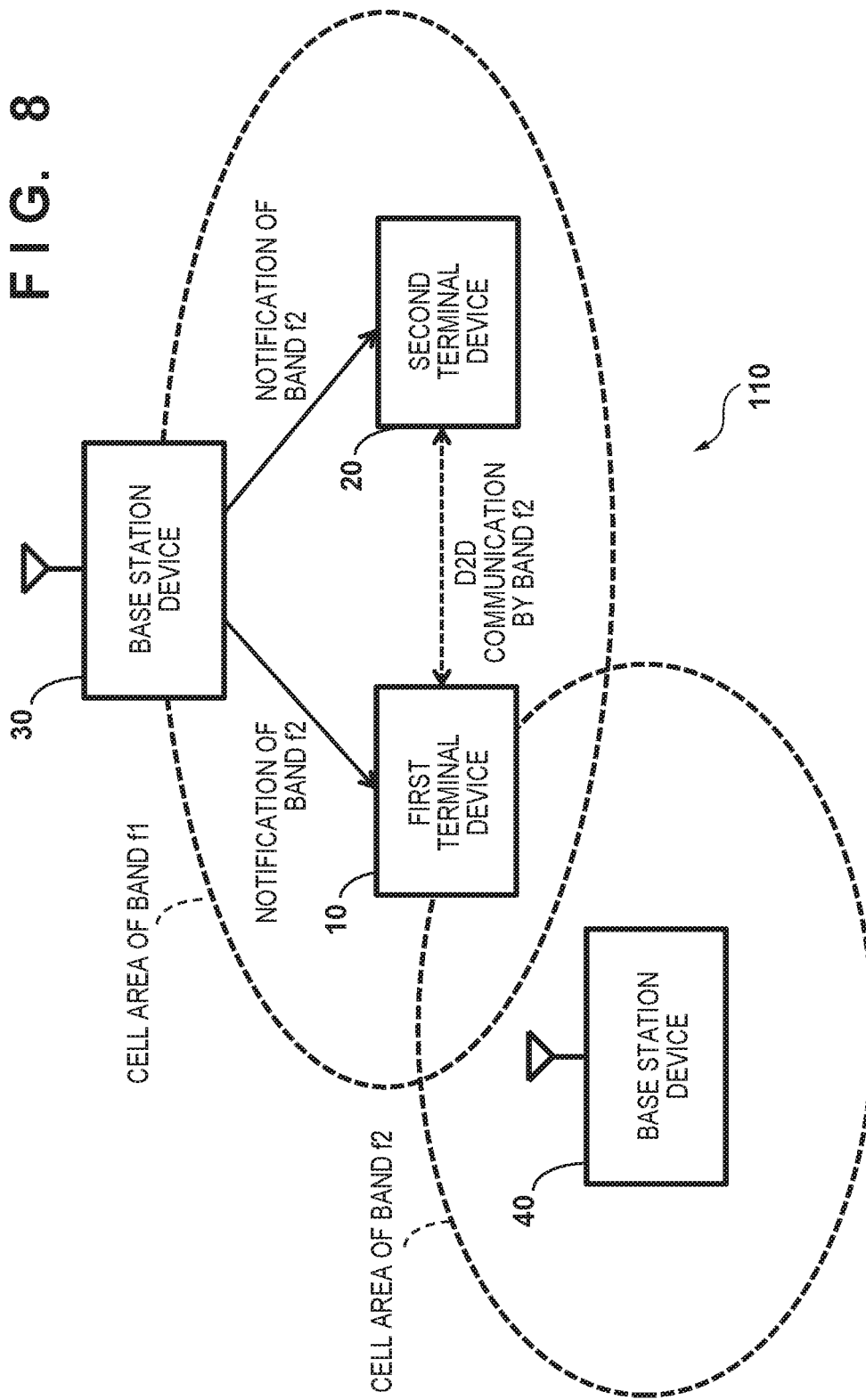
FIG. 8 is a block diagram showing an example of the arrangement of a wireless communication system according to Example 2.

FIG. 8 is a block diagram showing an example of the arrangement of a wireless communication system according to Example 2. In a wireless communication system 110, a first terminal device 10 and a second terminal device 20 exist in the cell area of a band f1 supported by a base station device 30, as in FIG. 1. D2D communication using a band f2 can be executed between the first terminal device 10 and the second terminal device 20 based on resource information notified by the base station device 30. Additionally, Example 2 assumes a case in which the first terminal device 10 that is executing D2D communication by the band f2 moves close to the cell area of a base station device 40 that supports the band f2 for cellular communication to cause interference in the D2D communication.

In Example 1, since a notification is made by broadcast using an SIB, it is impossible to notify different D2D resource information to each terminal device. In Example 2, however, it is possible to notify different D2D resource information to each terminal device by RRC signaling. Accordingly, in an area in which the base station device 40 that supports the band f2 for cellular communication and the base station device 30 that does not support the band f2 coexist, the band to execute D2D communication can dynamically be changed in accordance with the location of each terminal device or the result of measurement by each terminal device. This can suppress erroneous use of an unintended band by the terminal device.

Figure 9:
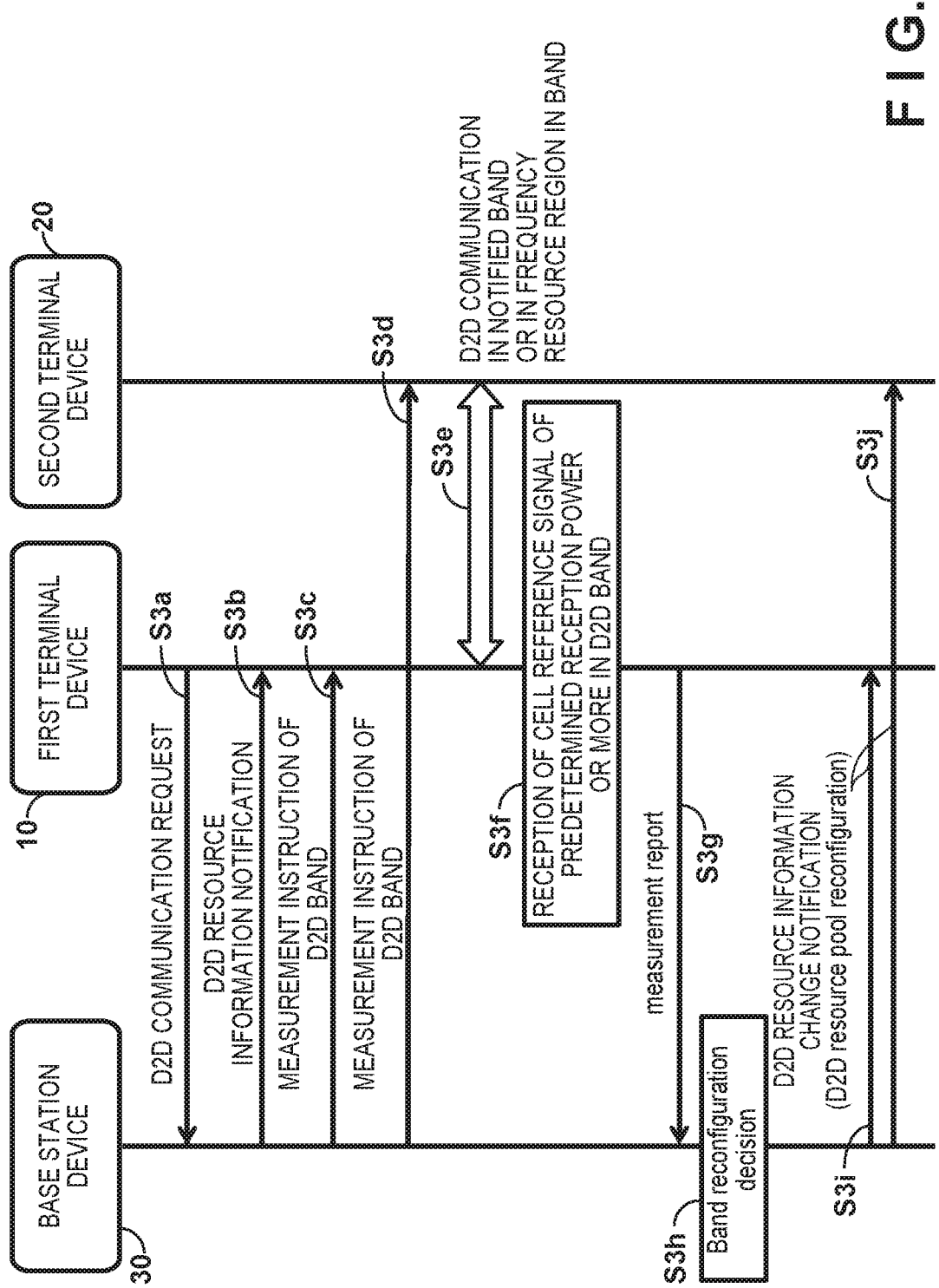
FIG. 9 is a sequence chart showing an example of the operation of the wireless communication system according to Example 2.

FIG. 9 is a sequence chart showing an example of the operation of the wireless communication system according to Example 2. Referring to FIG. 9, the first terminal device 10 transmits, to the base station device 30, a request signal to start D2D communication with the second terminal device 20 (step S3a). Upon receiving the request signal in step S3a, the base station device 30 notifies, by RRC signaling, D2D resource information that designates the band f2 unsupported by the base station or a frequency resource region in the band f2 as a radio resource usable for D2D communication (step S3b). The base station device 30 also transmits a measurement instruction of the D2D band f2 to the first terminal device 10 and the second terminal device 20 (steps S3c and S3d).

Each of the first terminal device 10 and the second terminal device 20 performs the processing shown in the flowchart of FIG. 7, thereby executing D2D communication in the band f2 notified in step S3b or in the frequency resource region in the band f2 (step S3e). During the D2D communication, the first terminal device 10 and the second terminal device 20 measure the radio quality of a downlink for each cell of the base station device 30 and base station devices on the periphery. Then, the state shown in FIG. 8 is formed. Upon receiving a cell reference signal of a predetermined power or more from the base station device 40 in the D2D band f2 (step S3f), the first terminal device 10 transmits a signal (measurement report) concerning a measurement report to the base station device 30 (step S3g). The measurement report can include an RSRP value or RSRQ value measured in step S3f.

Using the measurement report in step S3g as a trigger, the base station device 30 performs band reconfiguration decision to decide whether to make a band transition (step S3h). Based on the band reconfiguration decision, a D2D resource pool reconfiguration to notify the change of the D2D resource information is transmitted using a dedicated channel for each terminal device (steps S3i and S3j). For example, if an unused band f3 exists, the base station device 30 notifies the first terminal device 10 and the second terminal device 20, which are performing D2D communication, of D2D resource information including the band information of the band f3, thereby making a transition from the band f2 to the band f3. Note that upon deciding not to make a band transition in the band reconfiguration decision of step S3h, the base station device 30 does not transmit the D2D resource information change notification in steps S3i and S3j.

The band reconfiguration decision of step S3h will be described here. In Example 2, the band used to execute D2D communication by a terminal can be changed for each terminal device, as in steps S3i and S3j. For example, using information such as an RSRP value or RSRQ value in a different band cell (f2) included in a measurement report from a terminal device as a trigger condition for the change, the base station device 30 determines whether to make a band transition in accordance with an arbitrary combination of conditions Alt.1 to Alt.4 to be described below, and executes transition processing.

[Alt.1] If the RSRP value or RSRQ value in the different band cell (f2) in which D2D is being executed is equal to or larger than a predetermined threshold, band transition is executed. If the RSRP value or RSRQ value in the different band cell becomes large, an interference with the D2D communication under execution may occur. Hence, a band transition to a frequency that does not interfere with the band f2 is made to avoid the influence of interference.

[Alt.2] An applied interference amount to the different band cell (f2) in which D2D is being executed is estimated. If the applied interference amount is equal to or larger than a predetermined threshold, band transition is executed. The applied interference amount can be estimated based on the transmission power of the base station or the cell size (for example, a macro cell/micro cell).

[Alt.3] If the RSRP value or RSRQ value in the different band cell (f2) in which D2D is being executed is equal to or larger than a predetermined threshold, the resource is assigned only in the UL subframe of the band f2. By avoiding use of the DL subframe of the band f2 supported by the base station device 40, interference with downlink cellular communication executed by a terminal that exists in the neighborhood can be reduced.

[Alt.4] If the RSRP value or RSRQ value in the different band cell (f2) in which D2D is being executed is equal to or larger than a predetermined threshold, the TDD config information is notified to the terminal device. In Alt.4, execution of band transition or resource assignment for D2D is referred to the terminal device.

FIGS. 10A and 10B show the procedure of band transition processing of Alt.4. FIG. 10A shows a case in which no neighbor is established with respect to the cell (for example, a 3.5-GHz cell) of the base station device 40 adjacent to the base station device 30. FIG. 10B shows a case in which a neighbor is established with respect to the cell of the base station device 40 adjacent to the base station device 30. Note that steps S3e to S3g in FIGS. 10A and 10B represent the same processes as those of steps S3e to S3g in FIG. 9.

Referring to FIG. 10A, upon receiving a measurement report in step S3g, as described with reference to FIG. 9, if the RSRP value or RSRQ value in the different band cell (f2) included in the measurement report is equal to or larger than a predetermined threshold (step S4a), the base station device 30 instructs the first terminal device 10 and the second terminal device 20 to comply with the TDD config in the different band cell (steps S4b and S4c). For example, if no neighbor is established with respect to the cell of the band f2 of the base station device 40 adjacent to the base station device 30 (a mutually communicable state via an X2 interface or backhaul link is not established), the TDD config of the base station device 40 in the cell of the band f2 cannot be grasped. Hence, the terminal device is made to autonomously avoid the D1 subframe of the band f2. Note that if determining in step S4a that the RSRP value or RSRQ value in the different band cell (f2) is not equal to or larger than the predetermined threshold, the base station device 30 does not issue the instruction in steps S4b and S4c.

Referring to FIG. 10B, upon receiving a measurement report in step S3g, as described with reference to FIG. 9, if the RSRP value or RSRQ value in the different band cell (f2) included in the measurement report is equal to or larger than a predetermined threshold (step S5a), the base station device 30 notifies the first terminal device 10 and the second terminal device 20 of resource pool information according to the TDD config of the adjacent cell (steps S5b and S5c). For example, if a neighbor is established with respect to the cell of the band f2 of the base station device 40 adjacent to the base station device 30, the TDD config information of the base station device 40 in the cell can be acquired via the X2 interface. The base station device notifies, by RRC signaling, resource information according to the acquired TDD config information. Note that if determining in step S5a that the RSRP value or RSRQ value in the different band cell (f2) is not equal to or larger than the predetermined threshold, the base station device 30 does not make the notification in steps S5b and S5c.

As described above, according to Example 2, it is possible to dynamically change a radio resource from the wireless network side and appropriately manage the band used to execute D2D communication. It is therefore possible to provide D2D communication holding high communication continuity and also effectively use a radio resource.

EXAMPLE 3

Figure 11:
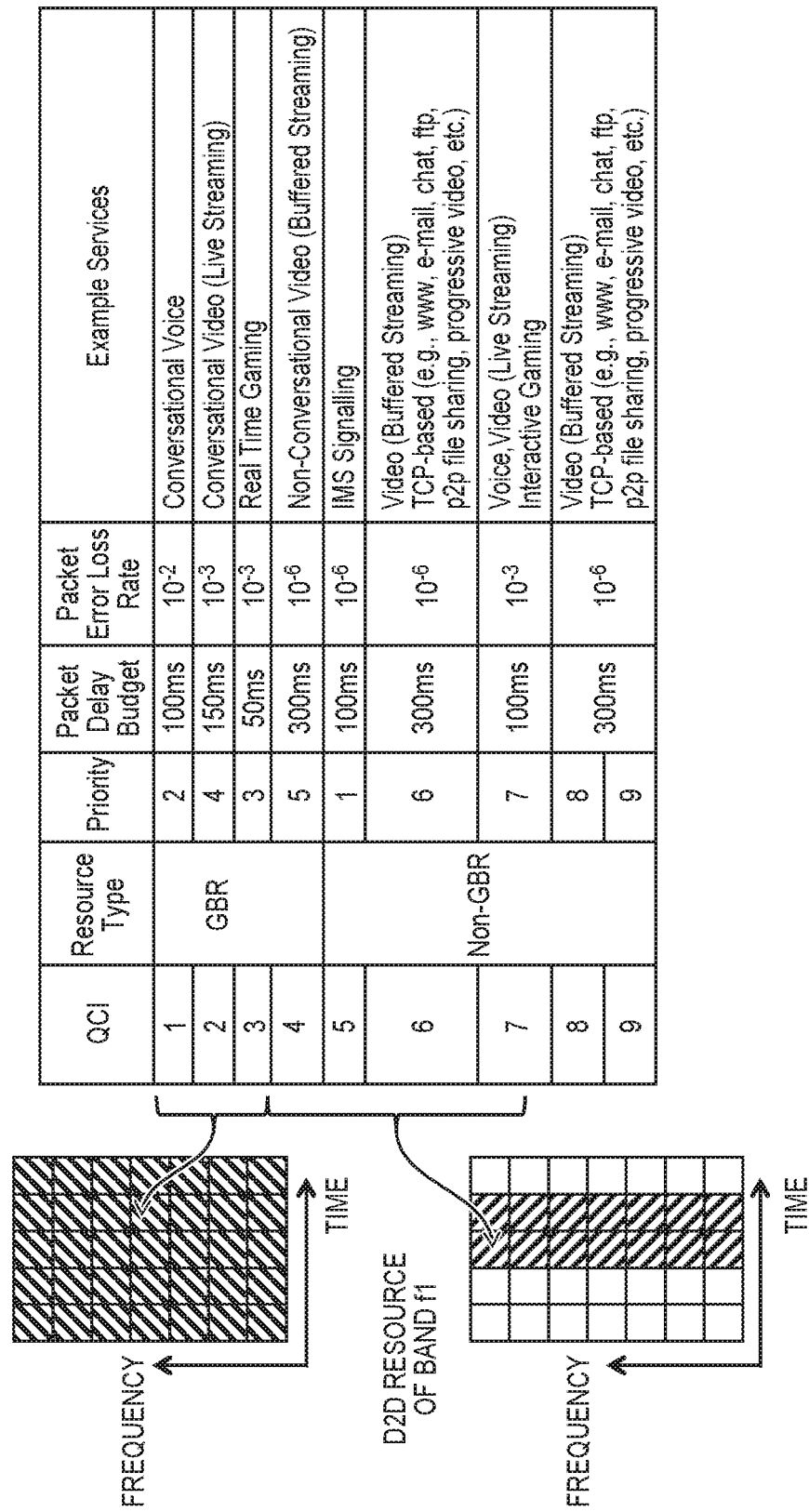
FIG. 11 is a view showing an example of assignment of D2D resources according to Example 3.

Example 3 of the present invention will be described with reference to FIGS. 11 to 13. Example 3 is a modification of Examples 1 and 2. In Examples 1 and 2, bands used to execute D2D communication are divided in consideration of QoS (Quality of Service). This makes it possible to provide appropriate radio quality according to a service request for each terminal device.

In Example 3, for example, bands used to execute D2D communication or resource pool regions are linked for each QCI (QoS Class Identifier) described in reference 3 (TS23.203 Ver.13.0.1, June 2014). For example, as shown in FIG. 11, QCI 1 to QCI 4 are linked with a D2D execution band f2, and QCI 5 to QCI 9 are linked with a D2D execution band f1. That is, for a terminal device that executes a service classified into GBR (Guaranteed Bit Rate) traffic, a band in which cellular communication does not exist is designated to increase the degree of freedom in resource assignment. For a terminal device that executes a service classified into non-GBR traffic, a D2D resource in a band in which cellular communication coexists is designated to do D2D resource assignment with priority on cellular communication. Note that a QCI table shown in FIG. 11 is not limited to this and can arbitrarily be set. The QCI table may appropriately be changed by, for example, determining the degree of congestion of each band in the base station.

FIG. 12 is a sequence chart showing an example of the operation of a wireless communication system according to Example 3 based on Example 1. The base station device 30 notifies, by an SIB, the first terminal device 10 and the second terminal device 20 of D2D resource information including band information usable for D2D or a frequency resource region in the band and an ID (for example, QCI) for identifying a D2D service type or service type permitted in each band (steps S6a and S6b). For example, QCI 1 to QCI 4 are linked with the D2D execution band f2 and notified.

Each of the first terminal device 10 and the second terminal device 20 collates the QCI notified by the D2D resource information with the type of the service of D2D traffic performed by the local terminal, and executes D2D communication in a corresponding band (step S6c).

FIG. 13 is a sequence chart showing an example of the operation of the wireless communication system according to Example 3 based on Example 2. The first terminal device 10 transmits, to the base station device 30, a request signal to start D2D communication with the second terminal device 20 (step S7a). In Example 3, information about the type of a service performed by the local terminal is included in the D2D communication request signal and notified to the base station device 30 for appropriate band determination in the base station device 30. The information about the type of the service can include, for example, a service type or an ID (for example, QCI) for identifying the service type. Based on the service type notified by the request signal, the base station device 30 designates, for each user by RRC signaling, a band appropriately usable by the terminal device to execute D2D communication of the service type (step S7b).

After that, as in Example 2, the base station device 30 transmits a measurement instruction for the D2D band to the first terminal device 10 and the second terminal device 20 (steps S7c and S7d). Each of the first terminal device 10 and the second terminal device 20 performs processing shown in the flowchart of FIG. 7, thereby executing D2D communication in the band notified in step S7b or in the frequency resource region in the band (step S7e).

As described above, according to Example 3, it is possible to assign an optimum radio resource to be used to execute D2D communication in accordance with a service type requested in the D2D communication. It is also possible to appropriately manage the band used to execute D2D communication and effectively use the radio resource.

The present invention has been described based on examples. The present invention is not limited to the above-described examples and the contents of the examples, and can variously be changed and practiced in the scope of the present invention. The examples are merely examples, and various modifications can be made for the combination of the constituent elements or processes. Such a modification is also incorporated in the present invention as is apparent for those skilled in the art.

The present invention is not limited to the embodiment, and various changes and modifications can be made without departing from the spirit and scope of the present invention.

Therefore, to apprise the public of the scope of the present invention, the following claims are made.

The invention claimed is:

1. A terminal device for performing terminal-to-terminal communication in which a plurality of terminal devices directly perform wireless communication without an intervention of a base station device, the device comprising:
   a communication unit configured to receive resource information for designating a frequency band unsupported by the base station device as a radio resource usable for the terminal-to-terminal communication; and
   a control unit configured to determine whether the terminal device can handle the radio resource designated by the resource information, if the control unit determines that the terminal device can handle the radio resource, control the terminal-to-terminal communication using the radio resource, and if the control unit determines that the terminal device cannot handle the radio resource, control the terminal-to-terminal communication using a usable radio resource supported by the base station device and permitted to be used for the terminal-to-terminal communication.

2. A communication method in a communication system including a plurality of terminal devices and a radio control device for controlling terminal-to-terminal communication in which the plurality of terminal devices directly perform wireless communication without an intervention of a base station device, the method comprising:
   in the radio control device,
   assigning a frequency band unsupported by the base station device as a radio resource usable for the terminal-to-terminal communication; and
   transmitting resource information for designating the assigned radio resource to the terminal devices, and
   in the terminal device,
   receiving the resource information; and
   determining whether the terminal device can handle the radio resource designated by the resource information, if the terminal device determines that the terminal device can handle the radio resource, executing the terminal-to-terminal communication using the radio resource, and if the terminal device determines that the terminal device cannot handle the radio resource, executing the terminal-to-terminal communication using a usable radio resource for the terminal-to-terminal communication in a frequency band supported by the base station device.

* * * * *